J. NAUGLE.
Pick.

No. 46,926.

Patented Mar. 21, 1865.

Witnesses:
Chas. Le Du Bois
Jos. K. Findley

Inventor:
John Naugle
by Metzger, Stubler & Sumper
Attys.

UNITED STATES PATENT OFFICE.

JOHN NAUGLE, OF MOORESVILLE, INDIANA.

IMPROVED HAND-CULTIVATOR.

Specification forming part of Letters Patent No. 46,926, dated March 21, 1865.

*To all whom it may concern:*

Be it known that I, JOHN NAUGLE, of the town of Mooresville, in the county of Morgan and State of Indiana, have invented a new and Improved Method of Constructing Hand-Cultivators; and I do hereby declare that the following is a full and exact description thereof, reference being had to the accompanying drawings, and to the letters of reference marked thereon.

The nature of my invention consists in constructing hand-cultivators in such a manner that the blade of the implement shall be permanently fixed and secured between two iron shoulders or bearings, and in so shaping the blade and so attaching it to the handle that the tool shall combine great strength with cheapness and durability, the object being to furnish an implement which shall do for the vegetable-garden what the subsoil-plow does for the field-crop—viz., stir the soil to a greater depth than can be done by the tools in common use.

To enable others skilled in the art to make and use my invention, I will proceed to describe its construction and operation.

Figure 1:
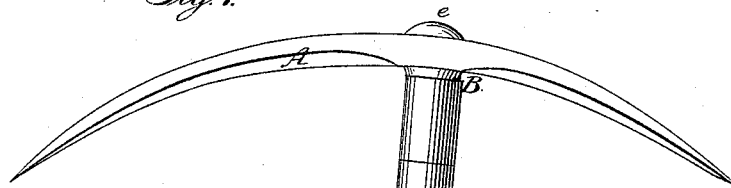
Figure 3:
Figure 2:
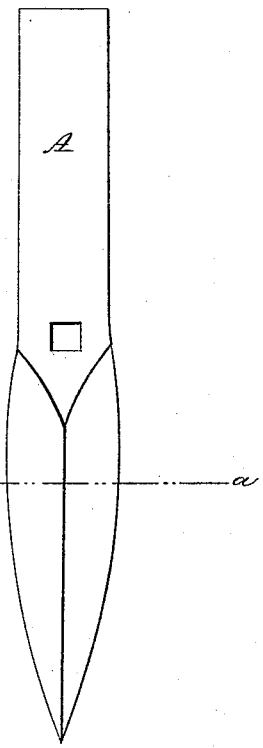
Figure 4:

In the drawings, Figure 1 represents the hand-cultivator complete and about half-size. Fig. 2 represents the blade or share of the plow; Fig. 3, the shank, which screws into the handle; and Fig. 4 is a cross-section of the blade on the line *a a*.

The blade, for about three-fifths of its length, or from near the eye, is drawn to an edge on each side from the middle and brought to a point, leaving a strong rib in the center on this end. The other end of the blade is brought to a cutting-edge. The shank is screwed firmly into the handle, and the blade, with a square eye or hole, is placed on the shoulder *d* of the shank, and then the end of the shank is firmly riveted down onto the blade, as shown in Fig. 1. In Fig. 3 the burr or riveted end is shown on the shank as when completed.

In operating the plow the pointed end is struck into the mellow ground and drawn through it to any desired depth, leaving the ground level, and not disturbing the growing plants.

Having thus described my invention, what I claim, and desire to secure by Letters Patent, is—

As a new article of manufacture, the herein-described hand-cultivator, when constructed substantially as herein set forth.

JOHN NAUGLE.

Witnesses:
   B. F. BUTLER,
   A. H. CRAYTON.